(12) United States Patent
Kurth

(10) Patent No.: US 9,482,316 B2
(45) Date of Patent: Nov. 1, 2016

(54) COMPOUND PLANETARY GEAR UNIT

(71) Applicant: Schaeffler Technologies GmbH & Co. KG, Herzogenaurach (DE)

(72) Inventor: Franz Kurth, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 39 days.

(21) Appl. No.: 14/467,598

(22) Filed: Aug. 25, 2014

(65) Prior Publication Data

US 2015/0065292 A1 Mar. 5, 2015

(30) Foreign Application Priority Data

Sep. 3, 2013 (DE) .................. 10 2013 217 522

(51) Int. Cl.
*F16H 1/46* (2006.01)
*F16H 57/08* (2006.01)

(52) U.S. Cl.
CPC ...................... *F16H 1/46* (2013.01)

(58) Field of Classification Search
CPC ...... F16H 1/46; F16H 1/2809; F16H 1/2863; F16H 57/08
See application file for complete search history.

(56) References Cited

U.S. PATENT DOCUMENTS

| 672,013 | A | * | 4/1901 | Rydberg | F16H 1/46 254/344 |
|---|---|---|---|---|---|
| 3,116,651 | A | * | 1/1964 | Hardy | F16H 1/28 475/344 |
| 3,792,629 | A | * | 2/1974 | Applebury | F16H 1/46 475/342 |
| 6,733,413 | B2 | * | 5/2004 | Lagarde | E06B 9/32 475/257 |
| 8,845,480 | B2 | * | 9/2014 | Zhang | F16H 1/46 475/331 |
| 2011/0009232 | A1 | * | 1/2011 | Kapelevich | F16H 1/46 475/331 |
| 2011/0275477 | A1 | * | 11/2011 | Hsieh | F16H 1/46 475/331 |
| 2014/0349801 | A1 | * | 11/2014 | Brenner | F16H 55/0806 475/149 |

OTHER PUBLICATIONS

Zahnradgetriebe [Toothed Gear Drive], Johannes Loomann, third edition published by Springer Verlag, 1995 (ISBN 3-540-60336-0), p. 117 with Figure 3.69-j in conjunction with p. 118.

* cited by examiner

*Primary Examiner* — Sherry Estremsky
(74) *Attorney, Agent, or Firm* — Simpson & Simpson, PLLC

(57) ABSTRACT

A compound planetary gear unit comprising a first planetary gear set, a second planetary gear set, a planet carrier for both planetary gear sets together, a first sun gear and a second sun gear as well as comprising a first ring gear and a second ring gear, wherein the first planetary gear set is formed by first planetary gears, which are carried by the planet carrier at a radial distance from a central axis of the compound planetary gear unit in such a way that each of said first planetary gears can be rotated about its own first axis of rotation.

18 Claims, 4 Drawing Sheets

COMPOUND PLANETARY GEAR UNIT

CROSS-REFERENCE TO RELATED APPLICATIONS

This patent application is filed under 35 U.S.C. §119(a) and claims priority to German Patent Application No. DE102013217522.1, filed Sep. 3, 2013, which application is hereby incorporated by reference in its entirety.

FIELD OF THE INVENTION

The invention relates to a compound planetary gear unit comprising a first planetary gear set, a second planetary gear set, a planet carrier for both planetary gear sets together, a first sun gear and a second sun gear as well as comprising a first ring gear and a second ring gear, wherein the first planetary gear set is formed by first planetary gears, which are carried by the planet carrier at a radial distance from a central axis of the compound planetary gear unit in such a way that each of said first planetary gears can be rotated about its own first axis of rotation, and which are thereby in meshing engagement with the first sun gear and the first ring gear, and wherein the second planetary gear set is formed by second planetary gears, which are carried by the planet carrier at a radial distance from the central axis in such a way that each of said second planetary gears can be rotated about its own second axis of rotation, and which are thereby in meshing engagement with the second sun gear and the second ring gear.

BACKGROUND OF THE INVENTION

Such a compound planetary gear unit is described by Johannes Loomann in *Zahnradgetriebe* [Toothed Gear Drive], third edition published by Springer Verlag, 1995 (ISBN 3-540-60336-0), page 117 with Figure 3.69-j in conjunction with page 118.

BRIEF SUMMARY OF THE INVENTION

The object of the present invention is to provide a compound planetary gear unit that is easy to construct and that is simple and inexpensive to manufacture. This object is achieved by a compound planetary gear unit comprising a first planetary gear set, a second planetary gear set, a planet carrier for both planetary gear sets together, a first sun gear and a second sun gear as well as comprising a first ring gear and a second ring gear, wherein the first planetary gear set is formed by first planetary gears, which are carried by the planet carrier at a radial distance from a central axis of the compound planetary gear unit in such a way that each of said first planetary gears can be rotated about its own first axis of rotation, and which are in meshing engagement with the first sun gear and the first ring gear, wherein the second planetary gear set is formed by second planetary gears, which are carried by the planet carrier at a radial distance from the central axis such that each of the second planetary gears can be rotated about its own axis of rotation, and are in meshing engagement with the second sun gear and the second ring gear.

The first sun gear comprises a first gear tooth system with a first number of teeth. The first number of teeth is different from a second number of teeth of a second gear tooth system of the second sun gear. In this case at least one of the first planetary gears of the first planetary gear set has a third gear tooth system with a third number of teeth, which is different from a fourth number of teeth of a fourth gear tooth system. At least one of the second planetary gears has the fourth gear tooth system. Working on this basis, the invention provides a compound planetary gear unit comprising two planetary gear sets, two sun gears and two ring gears, in which the number of teeth of the planetary gears and the number of teeth of the sun gears vary from planetary gear set to planetary gear set.

The sun gears, the ring gears and the planetary gears are preferably spur gears with either straight or helical teeth. The teeth of the sun gears can also be formed on the shaft ends or can sit on a shaft or more specifically are formed as gearwheels on a shaft. The teeth of the ring gears, which are the internal teeth, can be formed on drums, on rings or can be formed in a rotationally rigid manner on housings.

Embodiments of the invention provide that the number of teeth of the first sun gear is greater than the number of teeth of the second sun gear, wherein the first sun gear is arranged preferably at the input to the compound planetary gear unit; and wherein the input member of the compound planetary gear unit, for example, a shaft stub, is connected in one piece to both sun gears or to at least one of the sun gears that is mounted in a rotationally rigid manner; the planetary gears of the first planetary gear set are identical; or, if they are otherwise different in terms of their construction, they exhibit at least the same number of teeth; the second planetary gear set comprises two different types of planetary gears that are identical in terms of their construction or can be different in this respect, but their number of teeth varies; the number of teeth of at least one planetary gear of the second planetary gear set is greater than the number of teeth of the planetary gears of the first planetary gear set, wherein the planetary gears can be otherwise structurally identical or can be different in terms of their construction; the number of teeth of at least one planetary gear of the second planetary gear set is identical to the number of teeth of the planetary gears of the first planetary gear set, wherein the planetary gears can be structurally identical or can be different in terms of their construction; and that the ring gears of both planetary gear sets are designed so as to be identical or, as an alternative, are different in terms of their construction, but can have the same number of teeth.

The gearwheels are structurally identical, when their shaft seat, their dimensions, their teeth, etc. and their material are identical. There may be structural differences in the dimensions, the type of shaft seat, the type of design of the teeth and the composition of the material.

One embodiment of the invention provides that planetary pins are received on the left and the right on the end faces of the carrier plates of a planet carrier that is formed by the two carrier plates. The carrier plates are connected to each other by means of pins, housings, spacers, etc. As an alternative, the planet carrier also has a central plate. One planetary gear of the first planetary gear set sits together with one of the planetary gears of the second planetary gear set on each of the planetary pins. The planetary gears of both sets may be separated from each other by means of a carrier plate, spacers, disks and sleeves and are mounted in a sliding bearing or a rolling bearing on the respective planetary pin in such a way that said planetary gears can be rotated independently of each other.

One embodiment of the invention provides that one of the ring gears is arranged in such a way that it can be rotated about the central axis; and that a different one of the ring gears is held in a rotationally rigid manner with respect to the central axis. As an alternative, one or both of the ring gears is and/or are designed in such a way that one or both can be slowed down until reaching a standstill.

The invention provides a single design of a compound planetary gear unit. The planet carrier can be constructed simply and easily and from identical parts. The planetary pins, spacers, spacer sleeves and to some extent also the planetary gears of both planetary gear sets are designed as identical parts. The compound planetary gear unit and its individual parts can be produced and assembled easily and cost effectively.

BRIEF DESCRIPTION OF THE DRAWINGS

The invention is explained in detail below by means of one exemplary embodiment with reference to FIGS. 1 to 4.

DETAILED DESCRIPTION OF THE INVENTION

Figure 1:
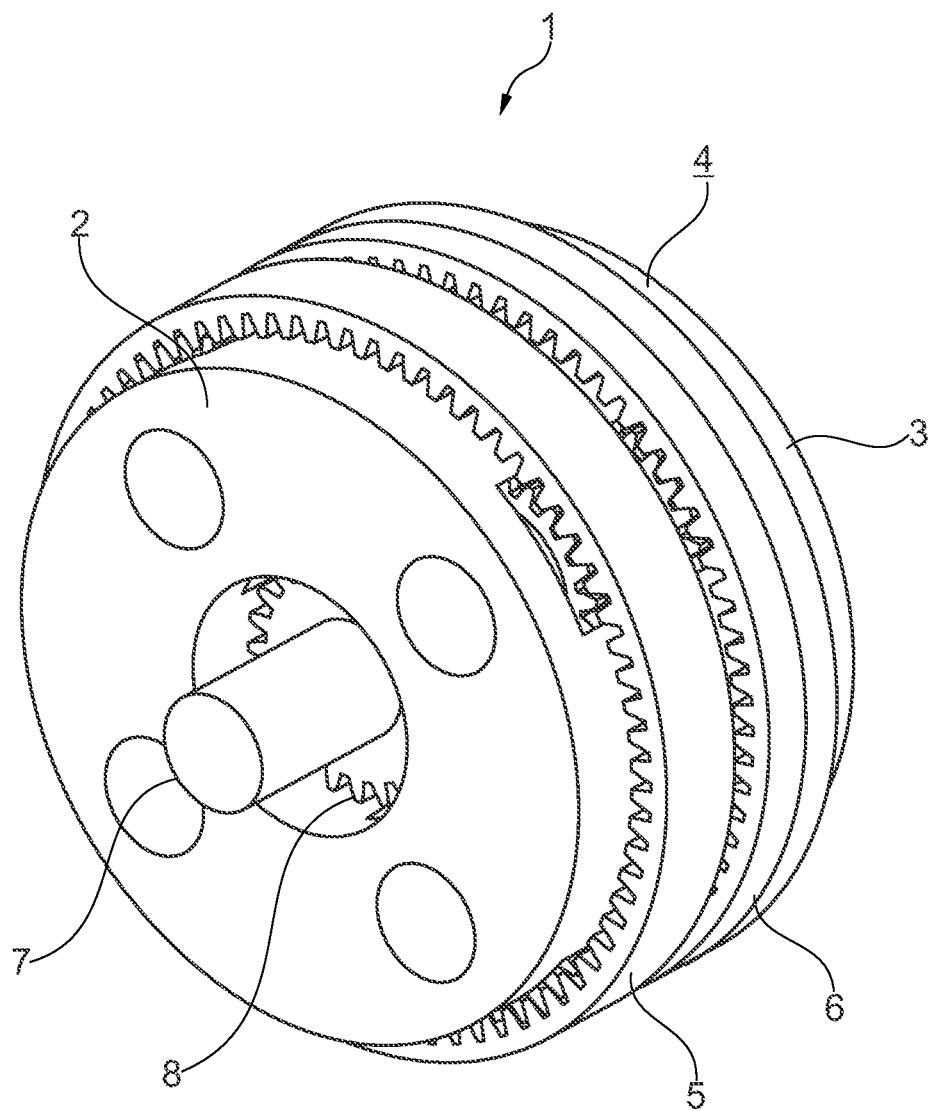
FIG. 1 is a main view of a compound planetary gear unit 1 according to the invention.

The compound planetary gear unit 1 is a compactly designed planetary gear unit, which is defined laterally by two carrier plates 2 and 3 of a planet carrier 4 and circumferentially by two ring gears 5 and 6 and is at least partially covered. In addition, the main view according to FIG. 1 shows a drive shaft 7, which is connected to a first sun gear 8 in such a way that it is rigid against rotation.

Figure 2:
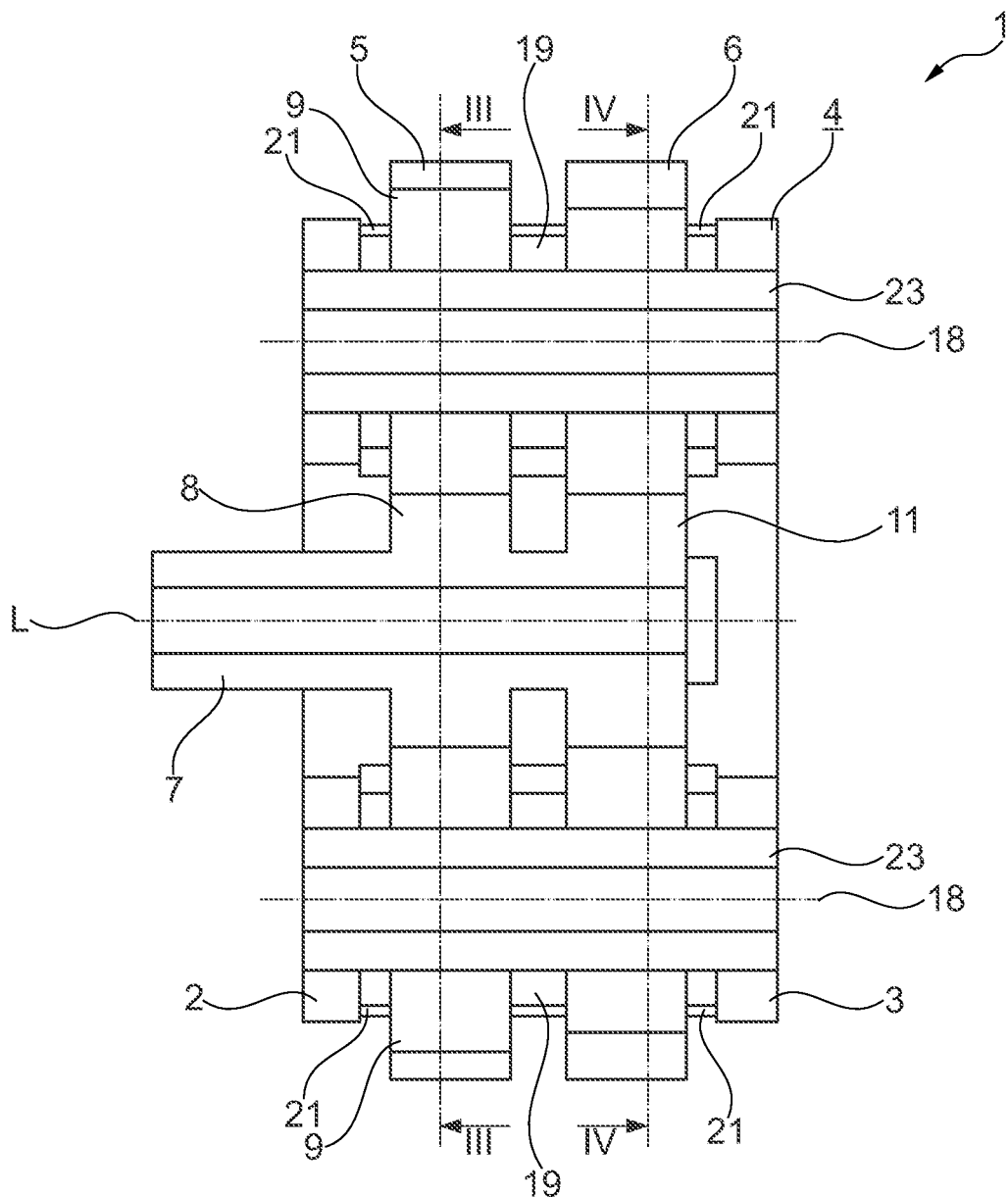
FIG. 2 is a longitudinal sectional view of the compound planetary gear unit from FIG. 1, as seen longitudinally along its central axis 24.

It is clear from FIG. 2 that the compound planetary gear unit 1 comprises the planet carrier 4, the ring gears 5 and 6, a first planetary gear set with the planetary gears 9 as well as a second planetary gear set with the planetary gears 10, the first sun gear 8 as well as a second sun gear 11. The sun gears 8 and 11 are connected to each other in a rotationally rigid manner, in that said sun gears are formed jointly on the drive shaft 7 and are arranged so as to be able to rotate with the drive shaft 7 about the central axis 24 of the compound planetary gear unit 1.

Figure 3:
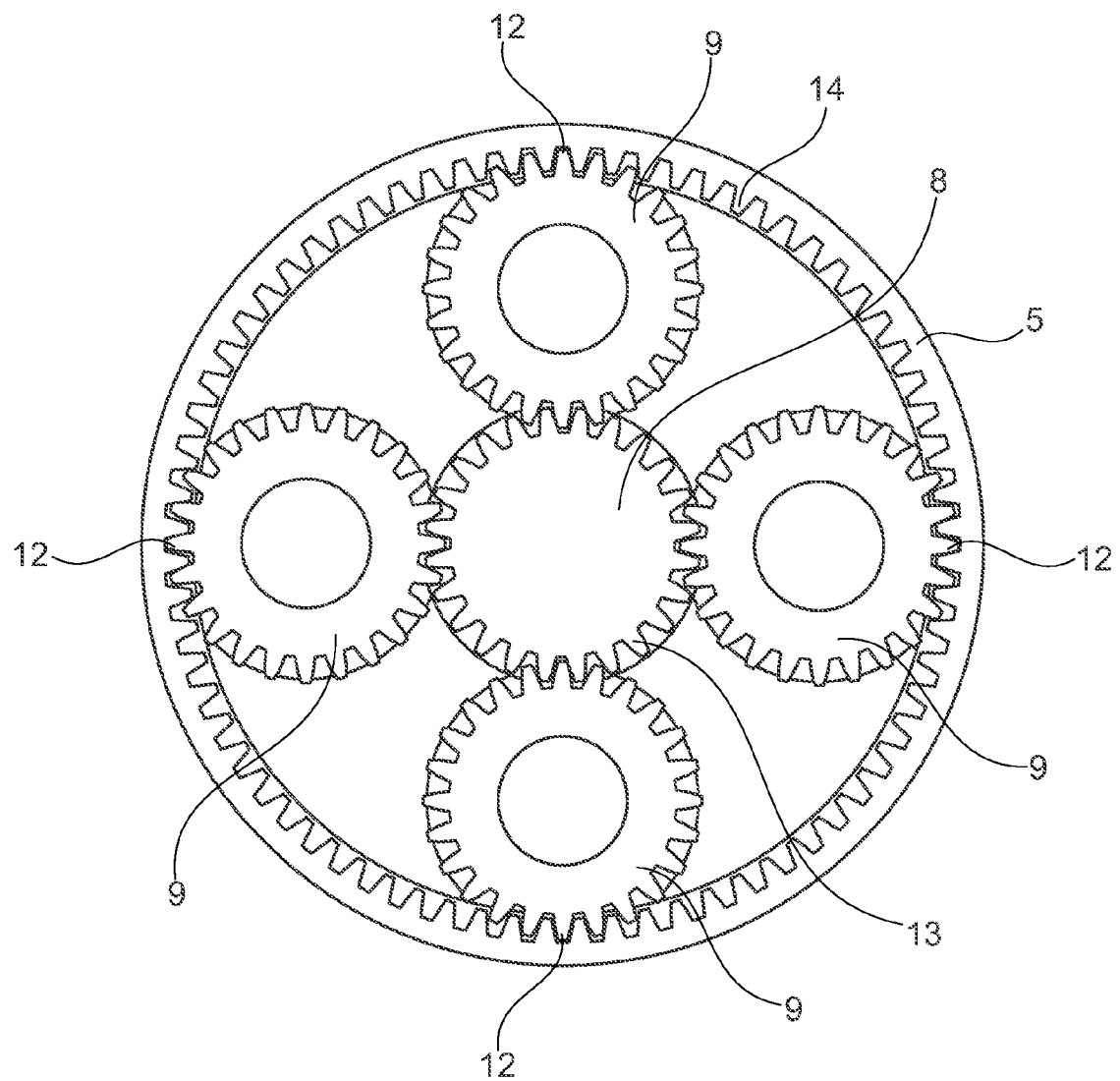
FIG. 3 is a cross sectional view of the compound planetary gear unit 1 along the line III-III from FIG. 2; and, FIG. 4 is a cross sectional view of the compound planetary gear unit along the line IV-IV from FIG. 2.

It is evident from the drawing in FIG. 3 that the first planetary gear set is formed by four planetary gears 9, of which the respective gear tooth system 12 is in meshing engagement with a gear tooth system 13 of the first sun gear 8 and with a first internal tooth system 14 of the first ring gear 5. In the illustrated example the gear tooth system 12 of the respective planetary gear 9 has a number of teeth $z1=24$. The gear tooth system 13 of the first sun gear 8 has a number of teeth $z2=24$; and the first internal tooth system 14 of the ring gear 5 has a number of teeth $z3=72$.

Figure 4:
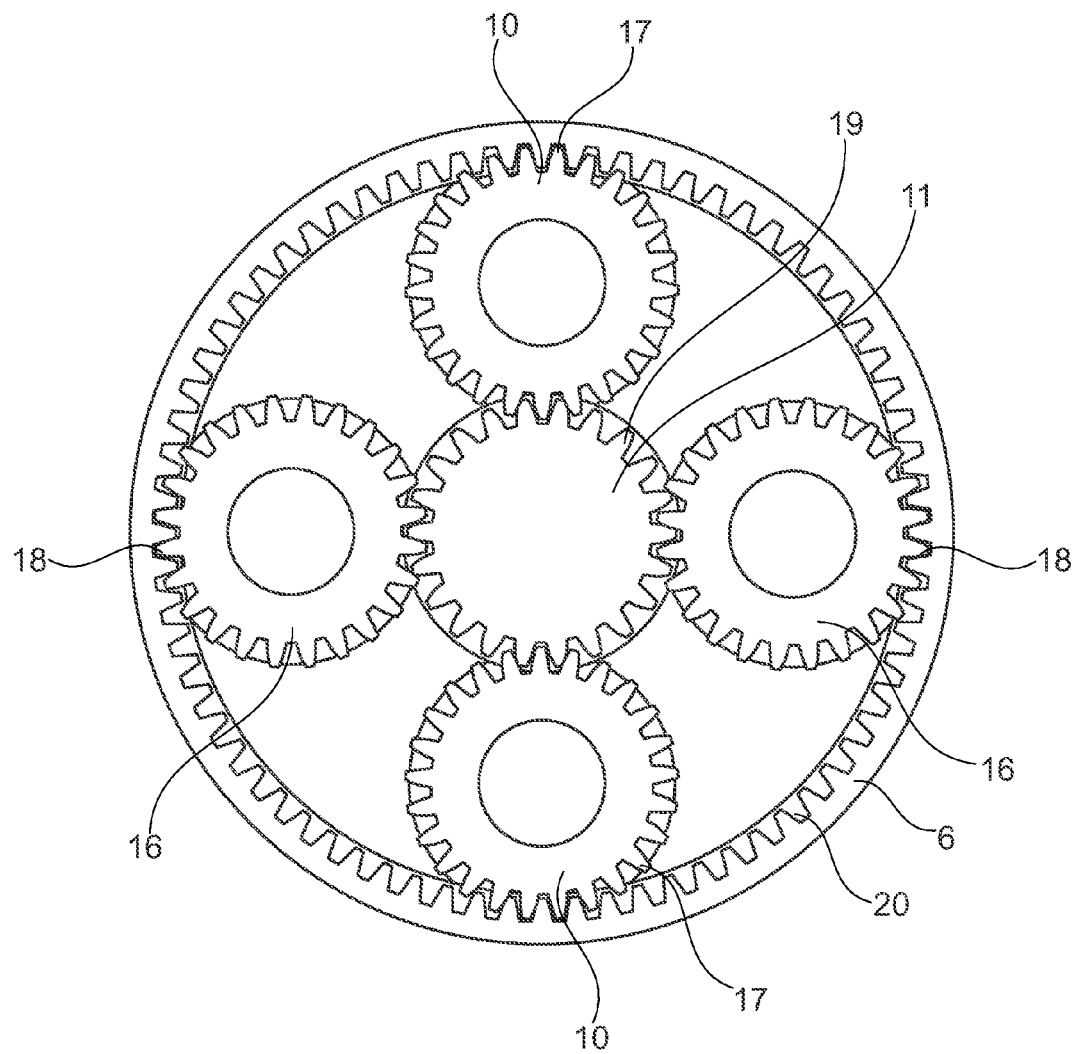

It is apparent from FIG. 4 that although the second planetary gear set is also provided with four planetary gears, they are not all identical. The second planetary gear set is formed by two planetary gears 10 and, in addition, by two planetary gears 16. Each of the planetary gears 10 has a gear tooth system 17; and each of the planetary gears 16 has a gear tooth system 18. The gear tooth system 17 or 18 of the respective planetary gear 10 or 16 is in meshing engagement with a gear tooth system 19 of the second sun gear 11 and an internal tooth system 24 of the second ring gear 6. In the illustrated example the gear tooth system 17 of each of the planetary gears 10 has a number of teeth $z4=25$; and the gear tooth system 18 of each of the planetary gears 16 has a number of teeth $z5=24$. The gear tooth system of the second sun gear 11 is provided with a number of teeth $z5=22$. The ring gear 6 has an internal tooth system 24 having a number of teeth $z6=72$.

It follows from the drawings in FIGS. 3 and 4 that the first sun gear 8 has a number of teeth $z2$ that is greater than the number of teeth $z5$ of the second sun gear 11; the planetary gears 9 of the first planetary gear set are identical; the second planetary gear set comprises two different types of planetary gears 10 and 16; the first planetary gear set comprises planetary gears 9 having a number of teeth $z1$ that is smaller than the number of teeth $z4$ of the planetary gears 10 of the second planetary gear set; the second planetary gear set comprises planetary gears 16 having a number of teeth $z5$ that is identical to the number of teeth $z1$ of the planetary gears 9 of the first planetary gear set; and that the ring gears 5 and 6 comprise gear tooth systems 14 and 20 having an identical number of teeth, but can be different in terms of their construction or can be structurally identical.

It is apparent from FIG. 2 that planetary pins 23 are received on the left and the right on the end faces of the carrier plates 2 and 3 of the planet carrier 4. A planetary gear 9 of the first planetary gear set sits together with one of the planetary gears 10 or 16 of the second planetary gear set on each of the planetary pins 17. The planetary gears 9 and 10 or 9 and 16 respectively sit together on a planetary pin 23 and are mounted on the respective planetary pin 23 in such a way that they can be rotated relative to each other about an axis of rotation 18, which is arranged axially parallel at a radial distance from the central axis 24. The planetary gears 9 and 10 or 9 and 16 respectively are separated from each other by means of spacer sleeves 19, which are simultaneously also the spacer bushings. Contact washers 21 sit between the respective planetary gear 9, 10 and 16 and the respective carrier plate 2 or 3.

One of the ring gears 5 or 6 is secured by choice in a rotationally rigid manner, for example, on a housing, which is not depicted herein. Working on the basis that the drive is accomplished by means of the drive shaft 7, the net result for the compound planetary gear unit 1, based on the aforementioned number of teeth, under the condition that: the ring gear 5 is secured and that the ring gear 6 is the output shaft, is a total gear ratio of +48; the ring gear 5 is the output shaft and that the ring gear 6 is secured, is a negative total gear ratio of −47.

What is claimed is:

1. A compound planetary gear unit, comprising:
   a first planetary gear set;
   a second planetary gear set;
   a planet carrier for both planetary gear sets together;
   a first sun gear;
   a second sun gear; and,
   a first ring gear and a second ring gear;
   wherein the first planetary gear set comprises first planetary gears, which are carried by the planet carrier at a radial distance from a central axis of the compound planetary gear unit in such a way that each of said first planetary gears can be rotated about its own first axis of rotation, and which are thereby in meshing engagement with the first sun gear and the first ring gear; and,
   wherein the second planetary gear set comprises second planetary gears, which are carried by the planet carrier at the radial distance from the central axis in such a way that each of said second planetary gears can be rotated about an axis of rotation, and which are thereby in meshing engagement with the second sun gear and the second ring gear;

wherein the first sun gear comprises a first gear tooth system with a first number of teeth that is different from a second number of teeth of a second gear tooth system of the second sun gear, and the second planetary gear set comprises at least one planetary gear with a third gear tooth system with a third number of teeth, which is different from a fourth number of teeth of a fourth gear tooth system of at least one of the second planetary gears; and, wherein the first ring gear has a fifth gear tooth system with a fifth number of teeth that is identical to a sixth number of teeth of a sixth gear tooth system of the second ring gear.

2. The compound planetary gear unit recited in claim 1, wherein the first number of teeth is greater than the second number of teeth.

3. The compound planetary gear unit recited in claim 1, wherein the third number of teeth is greater than the fourth number of teeth.

4. The compound planetary gear unit recited in claim 1, wherein at least two different planetary gears are arranged in at least one of the planetary gear sets, wherein the number of teeth of one of the gear tooth systems of one of the planetary gears is different from the number of teeth of a gear tooth system of the other one of the planetary gears.

5. The compound planetary gear unit recited in claim 1, wherein the first sun gear is connected in a rotationally rigid manner to the second sun gear and is arranged so as to be rotatable about the central axis together with the second sun gear.

6. The compound planetary gear unit recited in claim 1, wherein the planetary gears of both sets are accommodated on a common planet carrier.

7. The compound planetary gear unit recited in claim 1, wherein a first planetary gear of the first planetary gear set sits with a second planetary gear of the second planetary gear set on a common planetary pin, wherein the planetary pin is received by the planet carrier.

8. The compound planetary gear unit recited in claim 1, wherein one of the ring gears is arranged in such a way that it can be rotated about the central axis; and that a different one of the ring gears is held in a rotationally rigid manner with respect to the central axis.

9. The compound planetary gear unit recited in claim 1, wherein the first and second ring gears are identical in terms of construction.

10. A compound planetary gear unit, comprising:
a first planetary gear set;
a second planetary gear set;
a planet carrier for both planetary gear sets together;
a first sun gear;
a second sun gear; and,
a first ring gear and a second ring gear;
wherein the first planetary gear set comprises first planetary gears, which are carried by the planet carrier at a radial distance from a central axis of the compound planetary gear unit in such a way that each of said first planetary gears can be rotated about its own first axis of rotation, and which are thereby in meshing engagement with the first sun gear and the first ring gear; and, wherein the second planetary gear set comprises second planetary gears, which are carried by the planet carrier at the radial distance from the central axis in such a way that each of said second planetary gears can be rotated about an axis of rotation, and which are thereby in meshing engagement with the second sun gear and the second ring gear;

wherein the first sun gear comprises a first gear tooth system with a first number of teeth that is different from a second number of teeth of a second gear tooth system of the second sun gear, and the second planetary gear set comprises at least one planetary gear with a third gear tooth system with a third number of teeth, which is different from a fourth number of teeth of a fourth gear tooth system of at least one of the second planetary gears; and, wherein the first and second ring gears are identical in terms of construction.

11. The compound planetary gear unit recited in claim 10, wherein the first number of teeth is greater than the second number of teeth.

12. The compound planetary gear unit recited in claim 10, wherein the third number of teeth is greater than the fourth number of teeth.

13. The compound planetary gear unit recited in claim 10, wherein at least two different planetary gears are arranged in at least one of the planetary gear sets, wherein the number of teeth of one of the gear tooth systems of one of the planetary gears is different from the number of teeth of a gear tooth system of the other one of the planetary gears.

14. The compound planetary gear unit recited in claim 10, wherein the first sun gear is connected in a rotationally rigid manner to the second sun gear and is arranged so as to be rotatable about the central axis together with the second sun gear.

15. The compound planetary gear unit recited in claim 10, wherein the planetary gears of both sets are accommodated on a common planet carrier.

16. The compound planetary gear unit recited in claim 10, wherein a first planetary gear of the first planetary gear set sits with a second planetary gear of the second planetary gear set on a common planetary pin, wherein the planetary pin is received by the planet carrier.

17. The compound planetary gear unit recited in claim 10, wherein one of the ring gears is arranged in such a way that it can be rotated about the central axis; and that a different one of the ring gears is held in a rotationally rigid manner with respect to the central axis.

18. The compound planetary gear unit recited in claim 10, wherein the first ring gear has a fifth gear tooth system with a fifth number of teeth that is identical to a sixth number of teeth of a sixth gear tooth system of the second ring gear.

\* \* \* \* \*